(12) United States Patent
Koyama et al.

(10) Patent No.: US 11,022,183 B2
(45) Date of Patent: Jun. 1, 2021

(54) MANUFACTURING METHOD AND MANUFACTURING APPARATUS FOR UNIVERSAL JOINT

(71) Applicant: JTEKT CORPORATION, Osaka (JP)

(72) Inventors: Takeshi Koyama, Neyagawa (JP); Atsushi Tano, Sakurai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/599,179

(22) Filed: Oct. 11, 2019

(65) Prior Publication Data

US 2020/0132129 A1 Apr. 30, 2020

(30) Foreign Application Priority Data

Oct. 24, 2018 (JP) .............................. JP2018-200262

(51) Int. Cl.
*F16D 3/38* (2006.01)
*B21D 39/00* (2006.01)
*B23P 11/02* (2006.01)
*F16D 3/40* (2006.01)
*F16C 21/00* (2006.01)
*B23P 19/02* (2006.01)

(52) U.S. Cl.
CPC ............. *F16D 3/405* (2013.01); *B21D 39/00* (2013.01); *F16C 21/005* (2013.01); *F16D 3/382* (2013.01); *F16D 3/385* (2013.01); *B23P 11/02* (2013.01); *B23P 19/02* (2013.01); *B23P 2700/11* (2013.01); *F16D 3/40* (2013.01); *F16D 2250/0084* (2013.01); *F16D 2300/12* (2013.01)

(58) Field of Classification Search
CPC . F16D 3/382; F16D 3/385; F16D 3/41; F16D 3/405; F16D 2250/0061; F16D 2250/0084; F16D 2300/12; F16C 21/005; B23P 2700/11; B23P 11/005; B23P 11/02; B21D 39/00
See application file for complete search history.

(56) References Cited

U.S. PATENT DOCUMENTS 3,701,189 A * 10/1972 Kadono ................ F16C 21/005
29/898.07
4,704,782 A 11/1987 Spiess et al.
2017/0089397 A1 3/2017 Murata et al.

FOREIGN PATENT DOCUMENTS

DE 3537234 A1 4/1987
EP 2 924 307 A2 9/2015
(Continued)

OTHER PUBLICATIONS

Feb. 28, 2020 Extended European Search Report issued in European Patent Application No. 19204619.1.

*Primary Examiner* — Matthew P Travers
(74) *Attorney, Agent, or Firm* — Oliff PLC

(57) ABSTRACT

A method of manufacturing a universal joint includes: temporarily assembling a bearing, which supports a shaft portion of a joint spider such that the shaft portion is rotatable, with respect to a through-hole and the shaft portion by press-fitting the bearing to a first position in the through-hole of a yoke; and clinching, after the bearing is temporarily assembled, a portion of the yoke around the through-hole, and pressing the bearing deeper into the through-hole with a clinched portion formed by the clinching to press-fit the bearing to a second position located deeper than the first position in the through-hole.

3 Claims, 12 Drawing Sheets

(56) References Cited

FOREIGN PATENT DOCUMENTS

| EP | 3 139 051 A1 | 3/2017 | |
|---|---|---|---|
| JP | 55129623 A | * 10/1980 | ............ F16C 35/067 |
| JP | 2015-224682 A | 12/2015 | |

* cited by examiner

MANUFACTURING METHOD AND MANUFACTURING APPARATUS FOR UNIVERSAL JOINT

INCORPORATION BY REFERENCE

The disclosure of Japanese Patent Application No. 2018-200262 filed on Oct. 24, 2018 including the specification, drawings and abstract is incorporated herein by reference in its entirety.

BACKGROUND

1. Technical Field

The present disclosure relates to a manufacturing method and a manufacturing apparatus for a universal joint.

2. Description of Related Art

For example, a cross joint having a joint spider and a plurality of bearings is used in a steering apparatus for an automobile to connect a steering shaft and a pinion shaft (see, for example, Japanese Unexamined Patent Application Publication No. 2015-224682 (JP 2015-224682 A)). The joint spider has four shaft portions projecting in four directions. The shaft portions are rotatably supported by the bearings. A yoke having a pair of arms is provided at an end of each shaft, and the shaft portion of the joint spider is supported so as to be rotatable about its axis via each bearing in a through-hole formed in each arm. In order to fix the bearing in the through-hole, a part of the yoke around the through-hole is clinched.

SUMMARY

There are dimensional variations in the through-hole of the yoke or the bearing within a tolerance range, causing individual differences. Since the clinching described above is performed at a constant amount, the clinching cannot be reliably performed depending on the dimensions of the through-hole of the yoke or the bearing, and looseness may occur.

In addition, the bearing of the cross joint has a negative clearance with respect to the through-hole of the yoke, and is held by being press-fitted to the through-hole. The amount of negative clearance may decrease due to, for example, manufacturing errors of the yoke and the bearing, and differences in linear thermal expansion coefficient of the yoke and the bearing. Therefore, the clinching is applied around the through-hole of the yoke to restrain the bearing from falling off in the axial direction (as a fail-safe function). It is not essential to bring a clinched portion produced by clinching into contact with the bearing to achieve the fail-safe function. That is, when there is a clearance between the clinched portion and the bearing, the bearing and the clinched portion may come in contact with each other while a vehicle is traveling, which may cause noise.

The present disclosure provides a manufacturing method and a manufacturing apparatus for a universal joint that enable enhancing the reliability of the clinching with respect to the yoke and the bearing.

A method of manufacturing a universal joint according to a first aspect of the present disclosure includes: temporarily assembling a bearing, which supports a shaft portion of a joint spider such that the shaft portion is rotatable, with respect to a through-hole and the shaft portion by press-fitting the bearing to a first position in the through-hole of a yoke; and clinching, after the bearing is temporarily assembled, a portion of the yoke around the through-hole, and pressing the bearing deeper into the through-hole with a clinched portion formed by the clinching to press-fit the bearing to a second position located deeper than the first position in the through-hole.

In the method according to the above aspect, a distance between the first position and the second position may be 0.05 mm or more.

In the method according to the above aspect, the yoke and the bearing may be made of different metals.

A manufacturing apparatus for a universal joint according to a second aspect of the present disclosure includes a first shaft and a second shaft. The first shaft is configured to press-fit a bearing, which supports a shaft portion of a joint spider such that the shaft portion is rotatable, to a first position in a through-hole of a yoke, to temporarily assemble the bearing with respect to the through-hole and the shaft portion. The second shaft is configured to clinch, after the bearing is temporarily assembled, a portion of the yoke around the through-hole, and press the bearing deeper into the through-hole with a clinched portion formed by the clinching to press-fit the bearing to a second position located deeper than the first position in the through-hole.

In the apparatus according to the above aspect, the first shaft and the second shaft may be integrated.

In the apparatus according to the above aspect, the first shaft may be built in the second shaft so as to be advanceable and retractable.

The apparatus according to the above aspect may further include a switching mechanism. The switching mechanism may be configured to: bring the first shaft into connection with the second shaft when the first shaft press-fits the bearing to the first position; and release the connection when the bearing is press-fitted to the second position.

In the apparatus according to the above aspect, a distance between the first position and the second position may be 0.05 mm or more.

In the apparatus according to the above aspect, the yoke and the bearing may be made of different metals.

According to the first and second aspects of the present disclosure, it is possible to increase the reliability of the clinching with respect to the yoke and the bearing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the embodiment will be specifically described below with reference to the drawings. It should be noted that any embodiment described below illustrates a comprehensive or specific example. The numerical values, shapes, materials, components, arrangement positions and connection forms of the components, and the like described in the following embodiment are merely examples, and are not intended to limit the present disclosure. Further, among the components in the following embodiment, components not described in the independent claims indicating the highest concept are described as optional components.

It should be noted that the drawings are schematic, in which emphasis, omission, and ratio adjustment are made as appropriate to illustrate the present disclosure, and may differ from actual shapes, positional relationships, and ratios.

Figure 1:
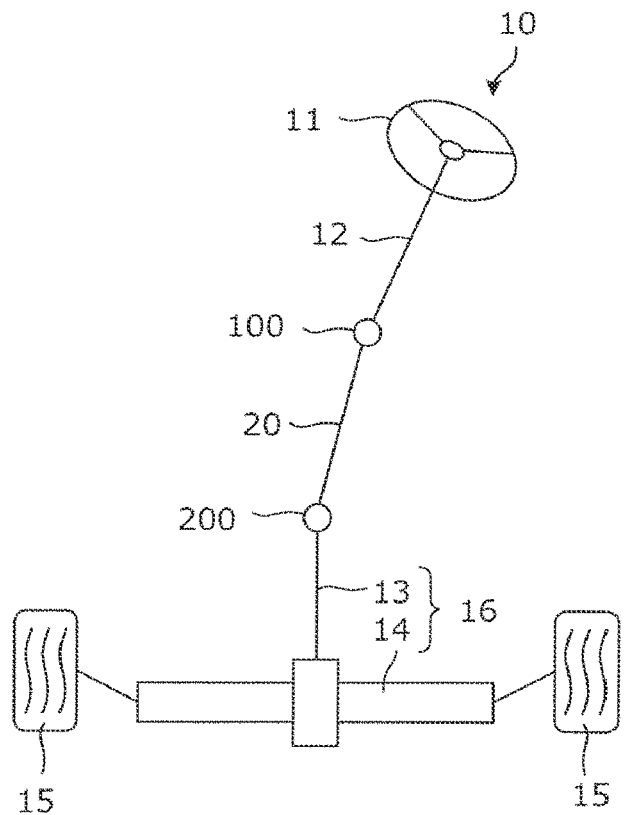
FIG. 1 is a schematic view showing an example of usage of a universal joint according to an embodiment.

FIG. 1 is a schematic view showing an example of usage of a universal joint according to an embodiment. As shown in FIG. 1, universal joints (a first universal joint 100 and a second universal joint 200) are provided in an intermediate shaft 20 included in, for example, a steering system 10 of an automobile. Specifically, the steering system 10 includes a steering shaft 12, a steering operation mechanism 16, and the intermediate shaft 20. A steering wheel 11 is connected at one end of the steering shaft 12. The steering operation mechanism 16 is composed of a rack and pinion mechanism including a pinion shaft 13 and a rack shaft 14 to steer steered wheels 15. The intermediate shaft 20 is interposed between the steering shaft 12 and the pinion shaft 13 to transmit steering torque.

One end of the intermediate shaft 20 is connected to the steering shaft 12 via the first universal joint 100. The other end of the intermediate shaft 20 is connected to the pinion shaft 13 via the second universal joint 200.

When the steering wheel 11 is operated to rotate the steering shaft 12, the rotation is transmitted to the pinion shaft 13 and the rack shaft 14 via the intermediate shaft 20. Thus, the steering operation mechanism 16 steers the steered wheels 15.

Figure 2:
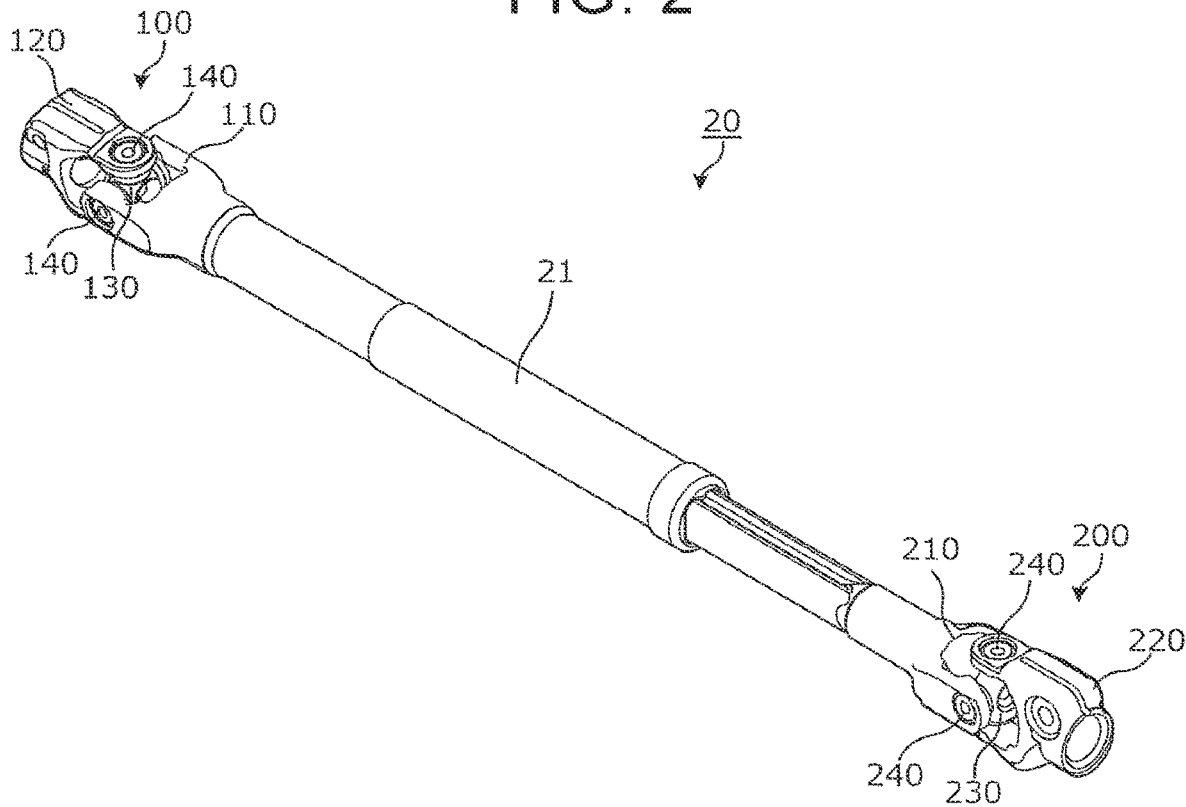
FIG. 2 is a perspective view showing a schematic configuration of an intermediate shaft according to the embodiment.

FIG. 2 is a perspective view showing a schematic configuration of the intermediate shaft 20 according to the embodiment. As shown in FIG. 2, the intermediate shaft 20 includes an extendable and retractable center shaft 21, the first universal joint 100 provided at one end of the center shaft 21, and the second universal joint 200 provided at the other end of the center shaft 21.

The first universal joint 100 includes a first yoke 110 coupled to the one end of the center shaft 21, a second yoke 120 coupled to the steering shaft 12, a joint spider 130 connecting the first yoke 110 and the second yoke 120 to each other, and a plurality of bearings 140 supporting shaft portions 132 (see FIG. 4) of the joint spider 130 such that the shaft portions 132 are rotatable.

The second universal joint 200 includes a first yoke 210 coupled to the other end of the center shaft 21, a second yoke 220 coupled to the pinion shaft 13, a joint spider 230 connecting the first yoke 210 and the second yoke 220 to each other, and a plurality of bearings 240 supporting shaft portions (not illustrated) of the joint spider 230 such that the shaft portions are rotatable.

The first universal joint 100 will be described in detail below. Since the first universal joint 100 and the second universal joint 200 basically have the same configuration, details of the second universal joint 200 will be omitted.

Figure 3:
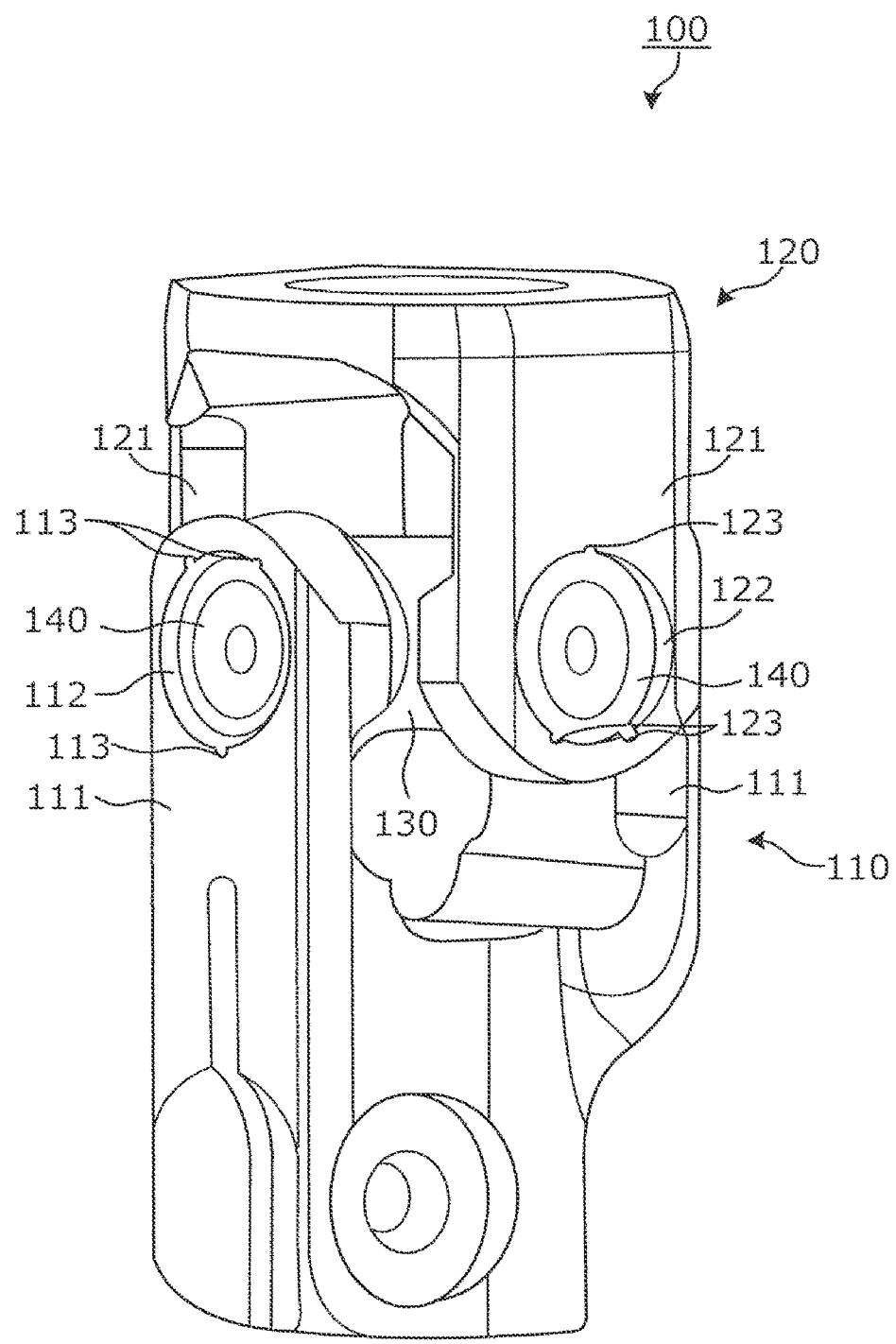
FIG. 3 is a perspective view showing a schematic configuration of a first universal joint according to the embodiment.
Figure 4:
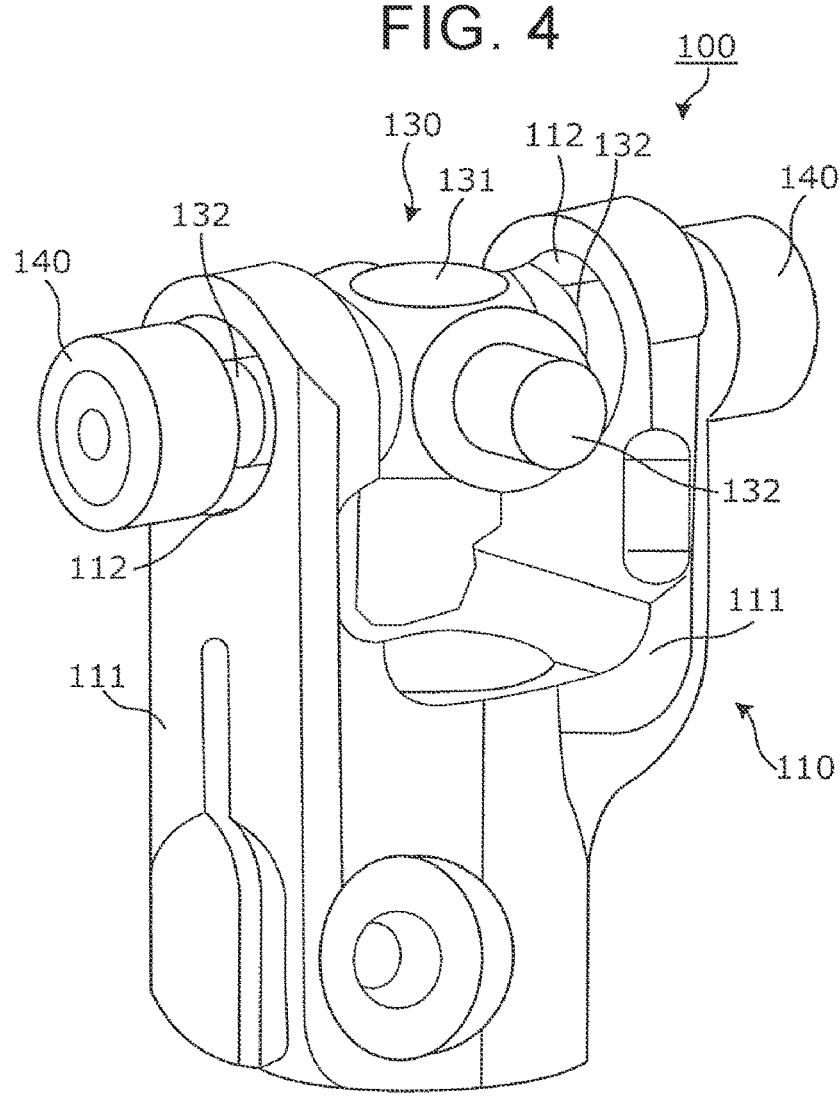
FIG. 4 is an exploded perspective view showing a part of the first universal joint according to the embodiment.

FIG. 3 is a perspective view showing a schematic configuration of the first universal joint 100 according to the embodiment. FIG. 4 is an exploded perspective view showing a part of the first universal joint 100 according to the embodiment. Specifically, in FIG. 4, the second yoke 120 of the first universal joint 100 is omitted.

As shown in FIGS. 3 and 4, the first yoke 110 is made of, for example, aluminum, and includes a pair of arms 111 disposed to face each other. A through-hole 112 for fixing the bearing 140 is formed in each of the arms 111. The through-holes 112 of the arms 111 have the same axis. The axis is referred to as a first axis.

As shown in FIG. 3, the second yoke 120 is made of, for example, aluminum, and includes a pair of arms 121 disposed to face each other. A through-hole 122 for fixing the bearing 140 is formed in each of the arms 121. The through-holes 122 of the arms 121 have the same axis. The axis is referred to as a second axis. The first axis and the second axis are orthogonal to each other. The first yoke 110 and the second yoke 120 may be made of, for example, an iron-based metal.

As shown in FIG. 4, the joint spider 130 is made of iron, and has a body portion 131 and four shaft portions 132 projecting in four directions from side peripheral surfaces of the body portion 131. Among the four shaft portions 132, a pair of shaft portions 132 facing each other is attached to the through-holes 112 of the arms 111 provided in the first yoke 110 via the bearings 140. The remaining pair of shaft portions 132 among the four shaft portions 132 is attached to the through-holes 122 of the arms 121 provided in the second yoke 120 via the bearings 140.

Figure 5:
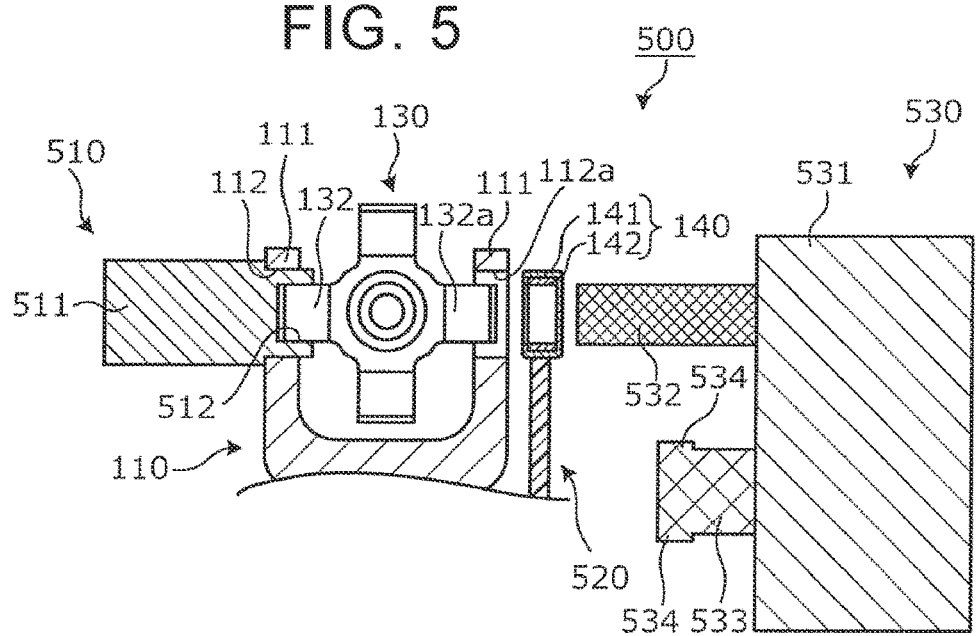
FIG. 5 is an explanatory view showing a main configuration of a manufacturing apparatus for the universal joint according to the embodiment.

Each of the bearings 140 includes a cup 141 and a plurality of rolling elements 142 made of iron (see FIG. 5).

The cup 141 has a bottomed cylindrical shape, and accommodates the rolling elements 142 therein. The rolling elements 142 are needle rollers arranged along a cylindrical inner peripheral surface of the cup 141. The inner peripheral surface of the cup 141 thus serves as a raceway surface for the rolling elements 142.

Each of the bearings 140 is press-fitted into the through-holes 112 of the arms 111 and the through-holes 122 of the arms 121. Each shaft portion 132 of the joint spider 130 is press-fitted to each bearing 140. Thus, the shaft portions 132 of the joint spider 130 are rotatably supported by the bearings 140 with respect to the arms 111 and 121. Therefore, the joint spider 130 rotates about both the first axis and the second axis.

As shown in FIG. 3, the first yoke 110 is provided with recesses 113 each formed around each through-hole 112. The recesses 113 are portions formed by clinching, and through plastic deformation of the portions, the bearings 140 are fixed at predetermined positions in the through-holes 112. Similarly, in the second yoke 120, recesses 123 for fixing the bearings 140 are each formed around each through-hole 122.

Next, the manufacturing method for the universal joint according to the embodiment is described. In the following description, a manufacturing method for the first universal joint 100 will be described as an example. Since the manufacturing method for the second universal joint 200 is the same as the manufacturing method for the first universal joint 100, the description thereof is omitted. Here, a case where the joint spider 130 and the bearing 140 are assembled to the first yoke 110 in the first universal joint 100 is exemplified. The same manufacturing method is employed in a case where the joint spider 130 and the bearing 140 are assembled to the second yoke 120.

First, a manufacturing apparatus 500 used in the manufacturing method for the universal joint is described. FIG. 5 is an explanatory view showing a main configuration of the manufacturing apparatus 500 of the universal joint according to the embodiment. In FIG. 5, members other than the joint spider 130 are illustrated in a cross-sectional view. Also in FIGS. 6 to 9, members other than the joint spider 130 are illustrated in a cross-sectional view. In FIG. 5, a state before the first universal joint 100 is assembled is shown.

The manufacturing apparatus 500 includes a yoke holding portion (not illustrated), a joint spider holding portion 510, a bearing holding portion 520, and a press-fit portion 530.

The yoke holding portion is a portion for holding the first yoke 110 at a predetermined position during assembly. The yoke holding portion retains the first yoke 110 at a predetermined position even when pressure is applied from the press-fit portion 530 to the first yoke 110 during assembly.

The joint spider holding portion 510 is a portion for holding the joint spider 130 with respect to the first yoke 110 held by the yoke holding portion. Specifically, the joint spider holding portion 510 includes a pin member 511, and a distal end of the pin member 511 is fitted in the through-hole 112 of the first yoke 110. A recess 512 is formed on a distal end surface of the pin member 511, and the shaft portion 132 of the joint spider 130 is fitted into the recess 512. Thereby, a relative positional relationship between the joint spider 130 and the first yoke 110 is fixed. In this state, the shaft portion 132 opposite to the shaft portion 132 fitted in the recess 512 is positioned in the other through-hole 112 of the first yoke 110. Through this positioning, the bearing 140 can be assembled to the shaft portion 132 opposite to the shaft portion 132 fitted in the recess 512, and to the other through-hole 112 of the first yoke 110. Hereinafter, the shaft portion 132 to which the bearing 140 is assembled are referred to as a "shaft portion 132a", and the through-hole 112 to which the bearing 140 is assembled are referred to as a "through-hole 112a". Through the positioning of the joint spider holding portion 510, the shaft portion 132a and the through-hole 112a are coaxially arranged.

The bearing holding portion 520 is a portion for holding the bearing 140 before assembly. The bearing holding portion 520 supports the bearing 140 to position the bearing 140 with respect to the shaft portion 132a and the through-hole 112a. Through the positioning of the bearing holding portion 520, the bearing 140 is disposed coaxially with the shaft portion 132a and the through-hole 112a. Hereinafter, an axial direction after the positioning described above is performed and extending from the bearing 140 toward the joint spider 130 will be referred to as a press-fitting direction, and the opposite direction will be referred to as a retracting direction. After the bearing 140 is press-fitted by the press-fit portion 530, the bearing holding portion 520 descends from the position at which the bearing 140 is supported and retracts.

The press-fit portion 530 is a portion for press-fitting the bearing 140 into the through-hole 112a of the first yoke 110 and the shaft portion 132a of the joint spider 130. Specifically, the press-fit portion 530 includes a pedestal 531, a first shaft 532, and a second shaft 533.

The pedestal 531 is a portion that moves while holding the first shaft 532 and the second shaft 533. Specifically, the pedestal 531 reciprocates in the axial direction or in a direction orthogonal to the axial direction (vertical direction in the embodiment) by power from a drive source (not illustrated). As a drive source, motors, such as a servomotor, are used, for example.

The first shaft 532 is a portion for press-fitting the bearing 140 to a first position P1 (see FIG. 6) in the through-hole 112a of the first yoke 110 to temporarily assemble the bearing 140 with respect to the shaft portion 132a of the joint spider 130. Specifically, the first shaft 532 is a cylindrical shaft elongated in the axial direction. A base end of the first shaft 532 is held by the pedestal 531. When the first shaft 532 moves closer to the joint spider 130 in the press-fitting direction through the movement of the pedestal 531, the distal end surface of the first shaft 532 abuts against the bearing 140, and the bearing 140 is inserted into the through-hole 112a to the first position P1.

Figure 6:
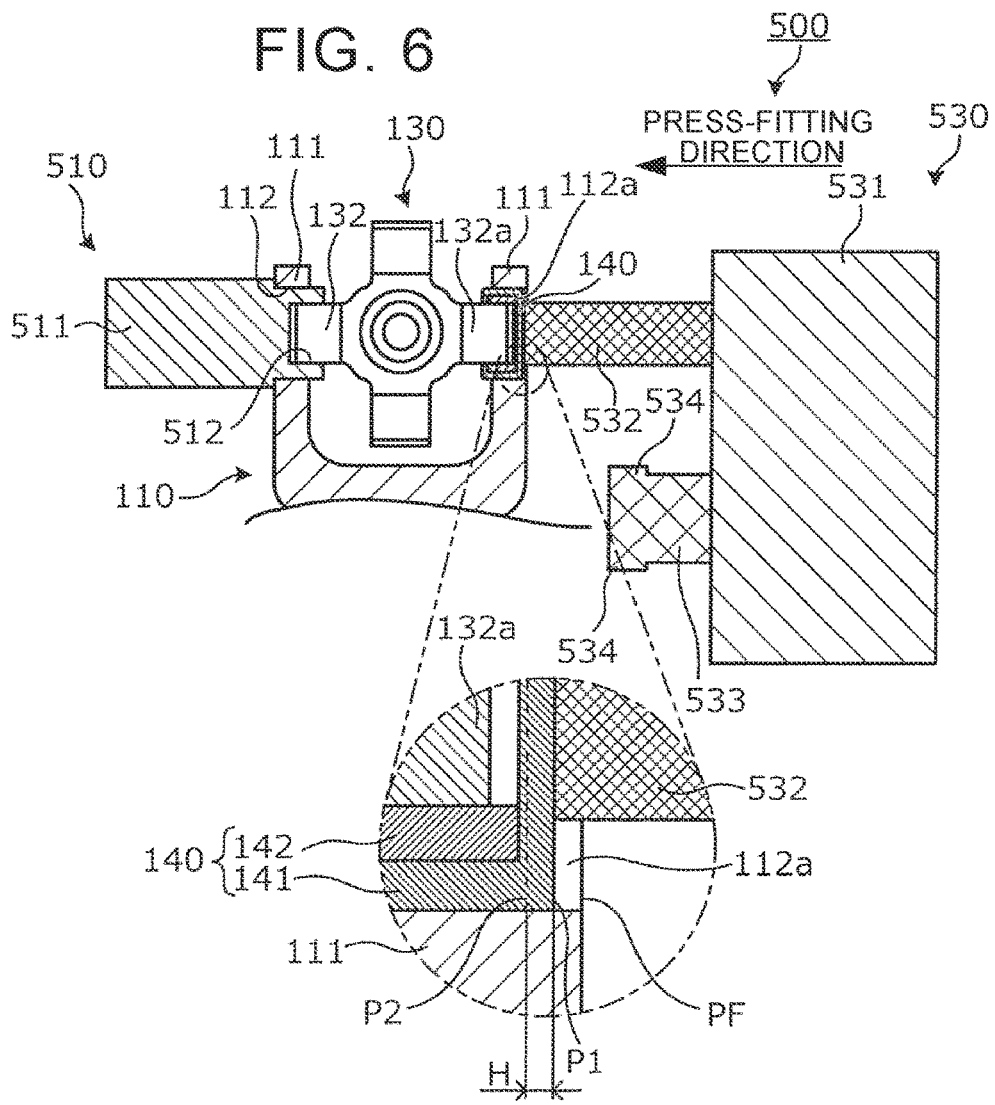
FIG. 6 is an explanatory view showing the manufacturing apparatus for the universal joint according to the embodiment and showing a state in which the universal joint is temporarily assembled.

FIG. 6 is an explanatory view showing the manufacturing apparatus 500 for the universal joint according to the embodiment and showing a state in which the universal joint is temporarily assembled. Here, an outer bottom surface of the cup 141 serves as a reference portion of the bearing 140. As shown in FIG. 6, the first position P1 is a position upstream of a second position P2 in the press-fitting direction (see FIG. 9). The second position P2 is the final assembly position of the bearing 140. The second position P2 is located deeper in the through-hole 112a than the first position P1 is. The first position P1 is a position downstream of a position PF in the press-fitting direction. At the position PF, the outer bottom surface of the cup 141 of the bearing 140 and an outer surface of the arm 111 in the first yoke 110 are flush. That is, the first position P1 is disposed between the second position P2 and the position PF. The first shaft 532 press-fits the bearing 140 only to the first position P1 in the through-hole 112a, thereby temporarily assembling the bearing 140 with respect to the through-hole 112a and the shaft portion 132a of the joint spider 130.

The second shaft 533 is a portion for press-fitting the bearing 140 at the first position P1 in the through-hole 112a to the second position P2. Specifically, the second shaft 533 is a cylindrical shaft elongated in the axial direction. The second shaft 533 is disposed below the first shaft 532, and a base end of the second shaft 533 is held by the pedestal 531.

On an outer peripheral surface at a distal end of the second shaft 533, a plurality of protrusions 534 projecting radially outward are provided. When the second shaft 533 moves closer to the joint spider 130 in the press-fitting direction through the movement of the pedestal 531, distal end surfaces of the protrusions 534 abut against a periphery of the through-hole 112a of the first yoke 110 to clinch the abutting portions. The second shaft 533 further presses the bearing 140 into the through-hole 112a with clinched portions 119 (see FIG. 9) formed by the clinching, thereby press-fitting the bearing 140 to the second position P2. The clinched portions 119 are provided on the first yoke 110 at positions corresponding to the recesses 113 (see FIG. 3).

Figure 7:
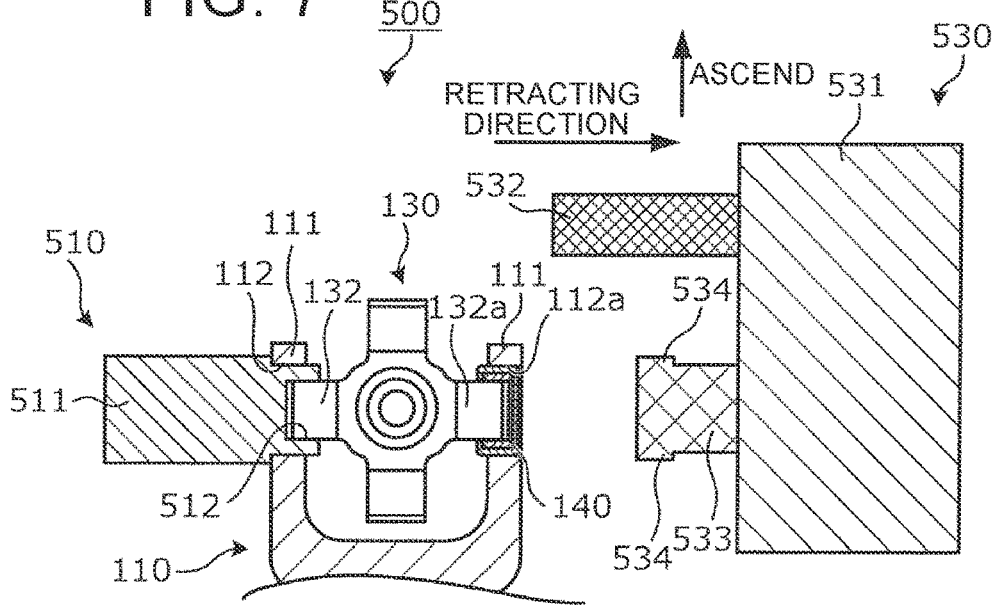
FIG. 7 is an explanatory view showing a process of a manufacturing method for the universal joint according to the embodiment.
Figure 8:
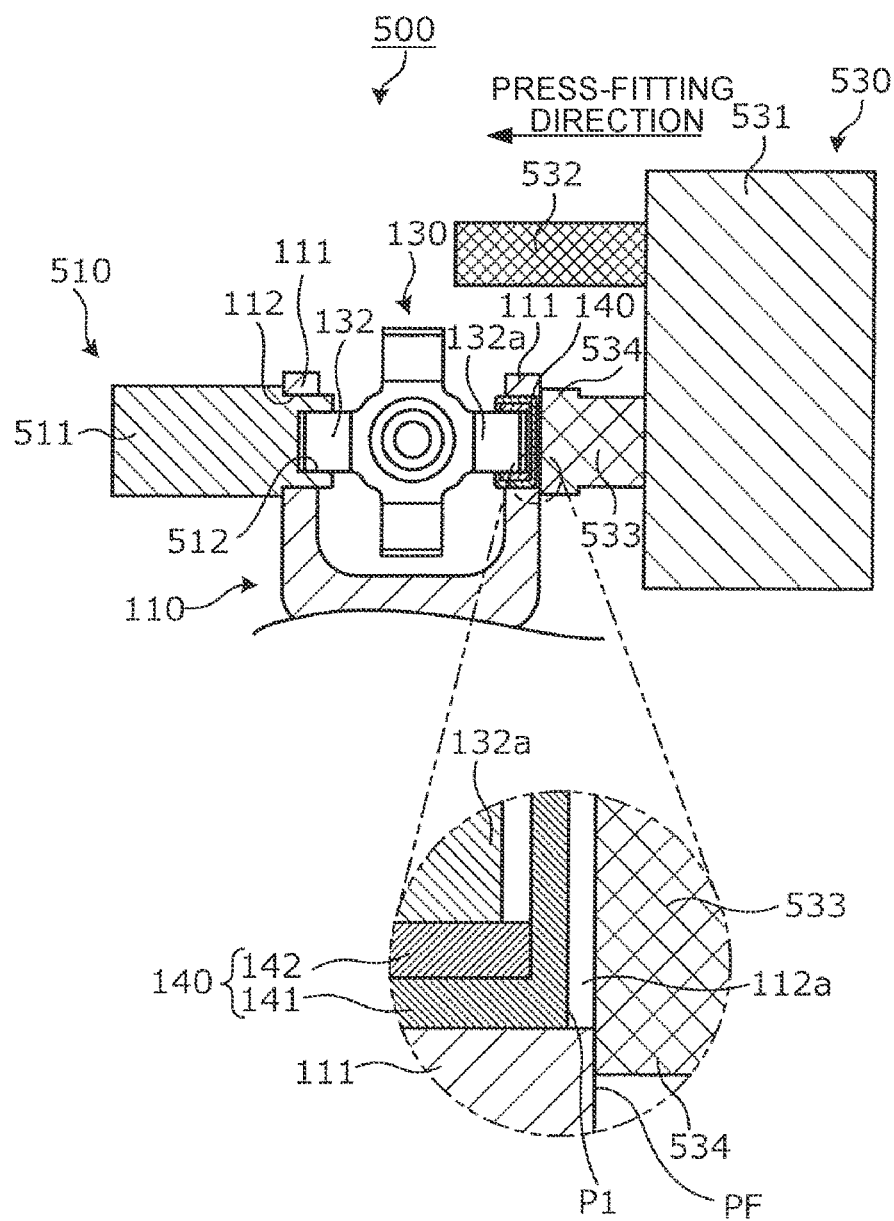
FIG. 8 is an explanatory view showing another process of the manufacturing method for the universal joint according to the embodiment.
Figure 9:
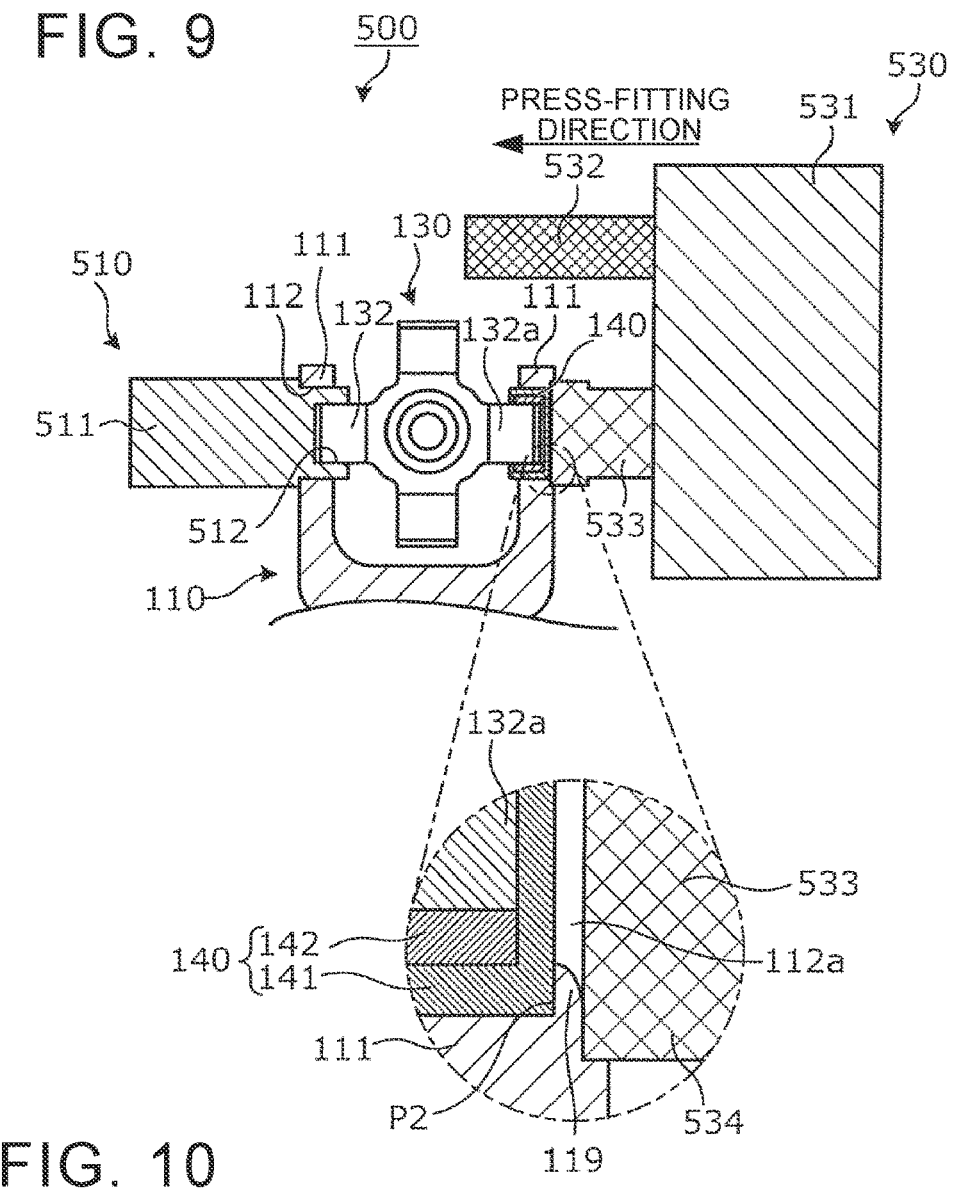
FIG. 9 is an explanatory view showing yet another process of the manufacturing method for the universal joint according to the embodiment.
Figure 10:
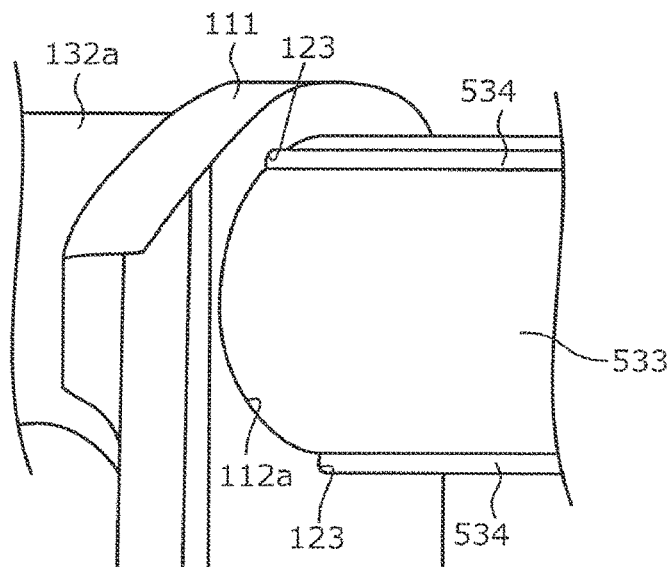
FIG. 10 is a perspective view showing a relationship between a second shaft and a first yoke in FIG. 9.

Next, a manufacturing method for a universal joint using the manufacturing apparatus 500 will be described based on FIGS. 5 to 10. FIGS. 7 to 9 are explanatory views showing processes of the manufacturing method for the universal joint according to the embodiment. FIG. 10 is a perspective view showing a relationship between the second shaft 533 and the first yoke 110 in FIG. 9.

As shown in FIG. 5, first, the first yoke 110, the joint spider 130, and the bearing 140 are set in the manufacturing apparatus 500. Specifically, the first yoke 110 is held by a yoke holding portion (not illustrated). The distal end of the pin member 511 of the joint spider holding portion 510 is fitted in the through-hole 112 of the first yoke 110, and the shaft portion 132 of the joint spider 130 is fitted in the recess 512 of the pin member 511. In this state, the shaft portion 132a opposite to the shaft portion 132 fitted in the recess 512 is positioned in the other through-hole 112a of the first yoke 110. The bearing 140 is supported by the bearing holding portion 520, whereby the bearing 140 is positioned with respect to the shaft portion 132a and the through-hole 112a. In this state, the bearing 140, the shaft portion 132a, the through-hole 112a, and the first shaft 532 are arranged on the same axis.

FIG. 6 shows the state of each part in a first press-fitting process. As shown in FIG. 6, when the pedestal 531 of the press-fit portion 530 advances in the press-fitting direction, the distal end surface of the first shaft 532 abuts against the bearing 140, and the bearing 140 is press-fitted to the first position P1 in the through-hole 112a. While the press-fitting is performed, the bearing holding portion 520 is descended at an appropriate timing so that interference with the second shaft 533 is prevented. The bearing 140 is assembled to the shaft portion 132a of the joint spider 130 while entering the through-hole 112a through the press-fitting. Since the bearing 140 is press-fitted to the first position P1, the bearing 140 is disposed at a position away from the second position P2, which is the final assembly position, by a distance H. That is, the bearing 140 is in a temporarily assembled state.

Next, as shown in FIG. 7, the pedestal 531 of the press-fit portion 530 moves in the retracting direction and then ascends, thereby retracting the first shaft 532 from a coaxis of the bearing 140 and disposing the second shaft 533 coaxially with the bearing 140.

FIGS. 8 and 9 show the state of each part in a second press-fitting process. Specifically, as shown in FIG. 8, when the pedestal 531 of the press-fit portion 530 advances in the press-fitting direction, the distal end surfaces of the protrusions 534 of the second shaft 533 abut against the periphery of the through-hole 112a of the first yoke 110. Subsequently, as shown in FIGS. 9 and 10, when the pedestal 531 of the press-fit portion 530 further advances in the press-fitting direction, the distal end surfaces of the protrusions 534 of the second shaft 533 clinch the abutting portions to form the clinched portions 119. By pressing the bearing 140 further into the through-hole 112a with the clinched portions 119, the second shaft 533 moves the bearing 140 from the first position P1 by the distance H, and press-fits the bearing 140 to the second position P2. The distance H is a length necessary for stably pressing the bearing 140 with the clinched portions 119, and is preferably 0.05 mm or more. Consequently, the bearing 140 is disposed at the final assembly position (second position P2).

As described above, the manufacturing method for the universal joint according to the embodiment includes the first press-fitting process and the second press-fitting process. In the first press-fitting process, the bearing 140 supporting the shaft portion 132a of the joint spider 130 so that the joint spider 130 is rotatable is press-fitted to the first position P1 in the through-hole 112a of the first yoke 110, whereby the bearing 140 is temporarily assembled with respect to the shaft portion 132a. In the second press-fitting process, after the first press-fitting process, a portion of the first yoke 110 around the through-hole 112a is clinched, and the bearing 140 is pressed deeper into the through-hole 112a with the clinched portions 119 formed by the clinching, thereby the bearing 140 is press-fitted to the second position P2 located deeper than the first position P1 in the through-hole 112a.

Further, the manufacturing apparatus 500 for the universal joint according to the embodiment includes the first shaft 532 and the second shaft 533. The first shaft 532 press-fits the bearing 140, supporting the shaft portion 132a of the joint spider 130 such that the joint spider 130 is rotatable, to the first position P1 in the through-hole 112a of the first yoke 110 to temporarily assemble the bearing 140 with respect to the through-hole 112a and the shaft portion 132a. After the bearing 140 is temporarily assembled, the second shaft 533 clinches the portion of the first yoke 110 around the through-hole 112a, and presses the bearing 140 deeper into the through-hole 112a with the clinched portions 119 formed by the clinching, to press-fit the bearing 140 to the second position P2 located deeper than the first position P1 in the through-hole 112a.

According to the above, since the bearing 140 is positioned at the first position P1 during temporary assembly, even if there are individual differences in the dimensions of the through-hole 112a of the first yoke 110 or the bearing 140, the bearing 140 is reliably disposed at the first position P1. Thereafter, the bearing 140 is press-fitted to the second position P2 with the clinched portions 119. Therefore, the clinched portions 119 are reliably brought into contact with the bearing 140 disposed at the second position P2. Thus, even if there are individual differences in the dimensions of the through-hole 112a of the first yoke 110 or the bearing 140, it is possible to enhance reliability of the clinching with respect to these portions. This can suppress occurrence of looseness. Further, even in the case where the clinching is performed for achieving the fail-safe function, the clinched portions 119 are reliably brought into contact with the bearing 140 such that generation of clearance between the bearing 140 and the first yoke 110 can be suppressed. Therefore, generation of abnormal noise can be suppressed.

The distance H between the first position P1 and the second position P2 is 0.05 mm or more. Since the distance H between the first position P1 and the second position P2 is 0.05 mm or more, the bearing 140 can be stably press-fitted to the second position P2 with the clinched portions 119.

The first yoke 110 and the bearing 140 are made of different metals. Here, when the first yoke 110 and the bearing 140 are made of different metals, a difference in thermal expansion coefficient between the first yoke 110 and the bearing 140 may cause insufficient press-fitting of the bearing 140. However, if the bearing 140 is press-fitted with the clinched portions 119 formed through plastic deformation, even if there is a difference in the thermal expansion coefficient, it is possible to enhance the reliability of the press-fitting. In particular, as described above, when the first yoke 110 is made of aluminum, thickness of the clinched portions 119 can be sufficiently secured, so that the reliability of press-fitting can be further enhanced.

The first shaft 532 and the second shaft 533 are integrated. Since the first shaft 532 and the second shaft 533 are integrated via the pedestal 531, the configuration and mechanism of the press-fit portion 530 can be simplified.

Modification

The configuration of the manufacturing apparatus for the universal joint is not limited to the configuration described in the above embodiment. A modification of the manufacturing apparatus for the universal joint is described below focusing on the difference from the above embodiment. In the following description, the same components as those in the above embodiment or the other modifications may be given the same reference numerals and descriptions thereof may be omitted.

First Modification

Figure 11:
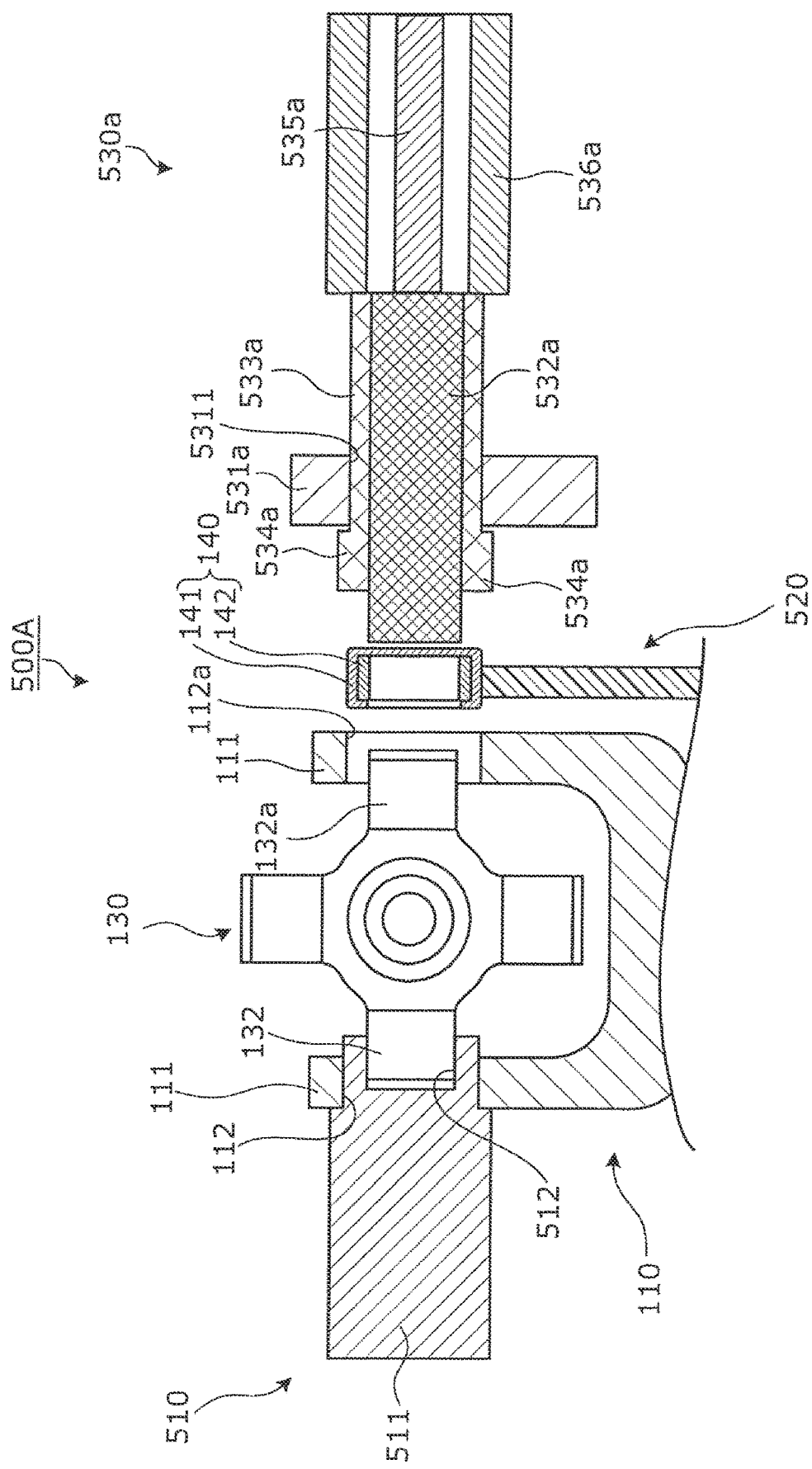
FIG. 11 is an explanatory view showing a main configuration of a manufacturing apparatus for a universal joint according to a first modification.

FIG. 11 is an explanatory view showing a main configuration of a manufacturing apparatus 500A for a universal joint according to a first modification. In FIG. 11, members other than the joint spider 130 are illustrated in a cross-sectional view. The same applies to FIGS. 12 and 13.

As shown in FIG. 11, in the manufacturing apparatus 500A according to the first modification, the press-fit portion 530a is different from the press-fit portion 530 of the manufacturing apparatus 500 according to the embodiment. Hereinafter, the press-fit portion 530a will be described in detail.

The press-fit portion 530a according to the first modification differs from the press-fit portion 530 of the manufacturing apparatus 500 according to the embodiment in that a first shaft 532a is built in a second shaft 533a so as to be advanceable and retractable.

Specifically, the press-fit portion 530a includes a support portion 531a, the first shaft 532a, the second shaft 533a, a first pressing portion 535a, and a second pressing portion 536a.

The support portion 531a is a portion supporting the second shaft 533a, in which the first shaft 532a is built, such that the second shaft 533a is slidable in the axial direction. A through-hole 5311 penetrating in the axial direction is formed in the support portion 531a, and the second shaft 533a is slidably fitted in the through-hole 5311. Thereby, positional deviation of the second shaft 533a in the direction orthogonal to the axial direction is restricted.

The first shaft 532a is a portion for press-fitting the bearing 140 to the first position P1 (see FIG. 12) in the through-hole 112a of the first yoke 110 to temporarily assemble the bearing 140 with respect to the shaft portion 132a of the joint spider 130. Specifically, the first shaft 532a is a cylindrical shaft elongated in the axial direction. A base end of the first shaft 532a is connected to the first pressing portion 535a. When the first shaft 532a moves closer to the joint spider 130 in the press-fitting direction by being pressed by the first pressing portion 535a, a distal end surface of the first shaft 532a abuts against the bearing 140, and the bearing 140 is press-fitted into the through-hole 112a to the first position P1.

Figure 13:
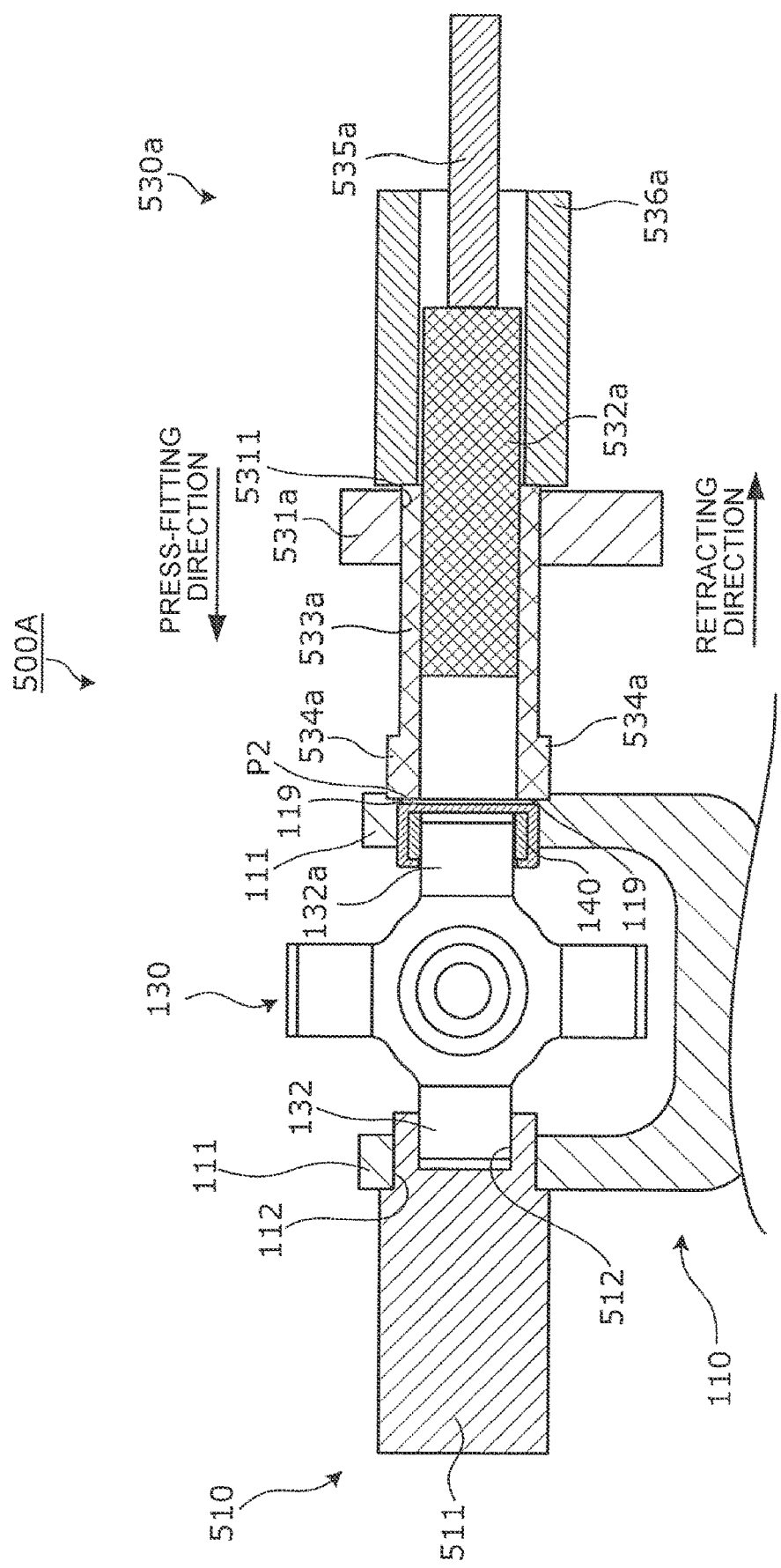
FIG. 13 is an explanatory view showing another process of the manufacturing method for the universal joint according to the first modification.

The second shaft 533a is a portion for press-fitting the bearing 140 at the first position P1 in the through-hole 112a to the second position P2 (see FIG. 13). Specifically, the second shaft 533a is a cylindrical shaft elongated in the axial direction. The base end of the second shaft 533a is connected to the second pressing portion 536a.

The first shaft 532a is slidably fitted in a hollow portion of the second shaft 533a. This allows relative movement of the second shaft 533a and the first shaft 532a on the same axis. That is, the first shaft 532a can be advanced and retracted from a distal end of the second shaft 533a.

On an outer peripheral surface at the distal end of the second shaft 533a, a plurality of protrusions 534a protruding radially outward are provided. When the second shaft 533a moves closer to the joint spider 130 in the press-fitting direction by being pressed by the second pressing portion 536a, distal end surfaces of the protrusions 534a abut against a periphery of the through-hole 112a of the first yoke 110 to clinch the abutting portions. The second shaft 533a further presses the bearing 140 into the through-hole 112a with the clinched portions 119 (see FIG. 13) formed by the clinching, thereby press-fitting the bearing 140 to the second position P2.

The first pressing portion 535a is a cylindrical shaft elongated in the axial direction, and its distal end is connected to the first shaft 532a. The first pressing portion 535a reciprocates in the axial direction by power from a drive source (not illustrated). Thereby, the first pressing portion 535a reciprocates the first shaft 532a in the axial direction.

The second pressing portion 536a is a cylindrical shaft elongated in the axial direction, and its distal end is connected to the second shaft 533a. The first shaft 532a and the first pressing portion 535a are inserted into a hollow portion of the second pressing portion 536a. Thus, movement of the first shaft 532a and the first pressing portion 535a does not inhibit movement of the second pressing portion 536a. The second pressing portion 536a reciprocates in the axial direction by power from a driving source (not illustrated) different from the driving source for the first pressing portion 535a. Thereby, the second pressing portion 536a reciprocates the second shaft 533a in the axial direction.

Figure 12:
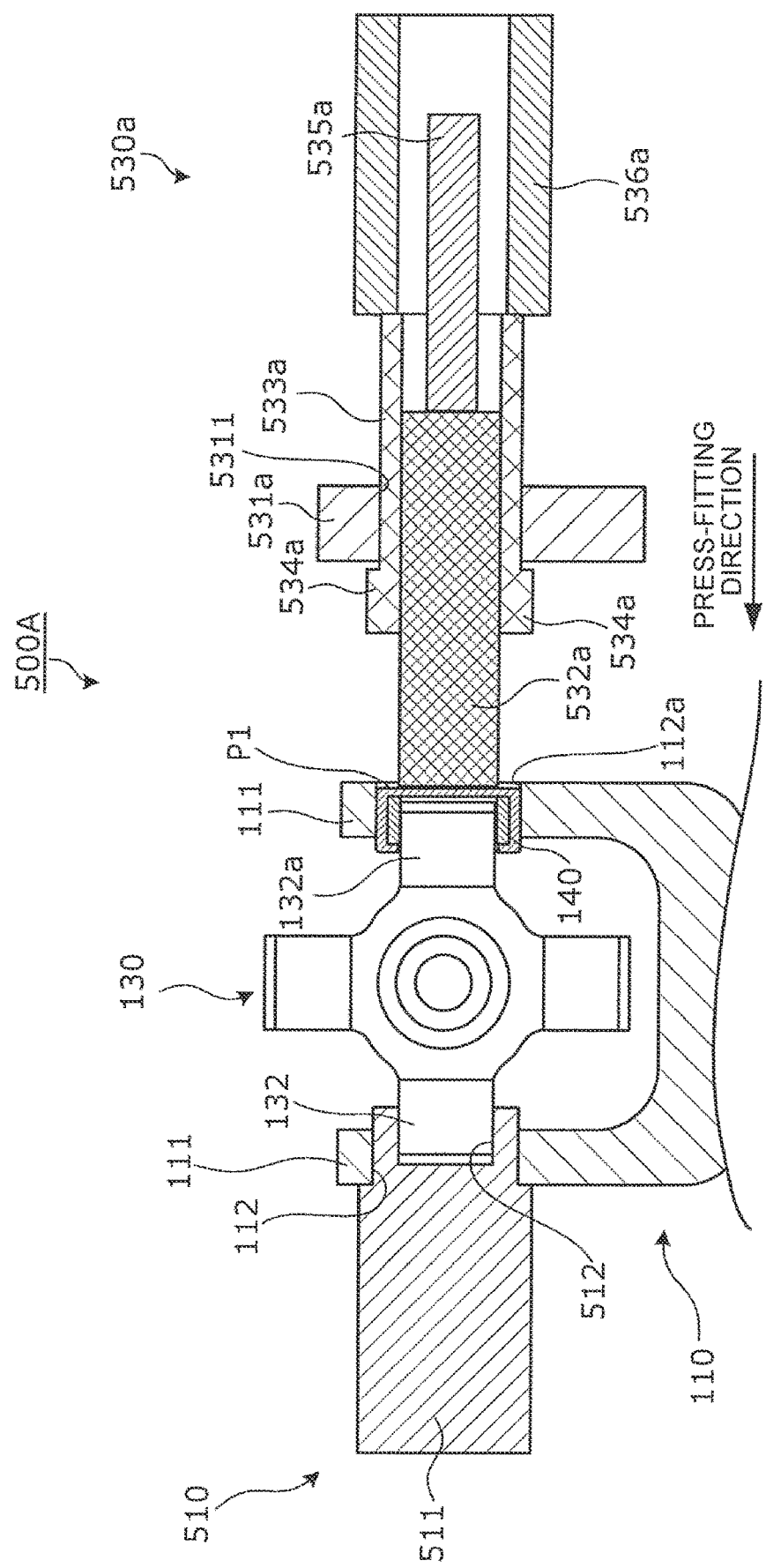
FIG. 12 is an explanatory view showing a process of a manufacturing method for the universal joint according to the first modification.

Next, a manufacturing method for a universal joint using the manufacturing apparatus 500A will be described based on FIGS. 11 to 13. FIGS. 12 and 13 are explanatory views showing processes of the manufacturing method for the universal joint according to the first modification.

As shown in FIG. 11, first, the first yoke 110, the joint spider 130, and the bearing 140 are set in the manufacturing apparatus 500A. In this state, the bearing 140, the shaft portion 132a, the through-hole 112a, the first shaft 532a, and the second shaft 533a are arranged on the same axis.

FIG. 12 shows the state of each part in the first press-fitting process in the first modification. As shown in FIG. 12, when the first pressing portion 535a of the press-fit portion 530a advances in the press-fitting direction, the first shaft 532a is also pressed and advances in the press-fitting direction. Thereby, the distal end surface of the first shaft 532a abuts against the bearing 140, and the bearing 140 is press-fitted into the through-hole 112a to the first position P1. Before the press-fitting is performed, the bearing holding portion 520 is descended at an appropriate timing so that interference with the second shaft 533a is prevented. The bearing 140 is assembled to the shaft portion 132a of the joint spider 130 while entering the through-hole 112a through the press-fitting. With the bearing 140 press-fitted to the first position P1, the bearing 140 is in a temporarily assembled state.

FIG. 13 shows the state of each part in the second press-fitting process according to the first modification. Specifically, as shown in FIG. 13, while the second pressing portion 536a advances in the press-fitting direction, the first pressing portion 535a retracts in a retracting direction. Thereby, the second shaft 533a advances in the press-fitting direction to press-fit the bearing 140, whereas the first shaft 532a retracts in the retracting direction and retracts from the bearing 140. The first shaft 532a and the second shaft 533a may be retracted simultaneously.

When the second shaft 533a advances in the press-fitting direction, the distal end surfaces of the protrusions 534a abut against the periphery of the through-hole 112a of the first yoke 110. Subsequently, the distal end surfaces of the protrusions 534a clinch the abutting portions to form the clinched portions 119. The second shaft 533a further presses the bearing 140 into the through-hole 112a with the clinched portions 119, thereby press-fitting the bearing 140 from the first position P1 to the second position P2. Consequently, the bearing 140 is disposed at the final assembly position (second position P2).

As described above, the first shaft 532a is built in the second shaft 533a so as to be advanceable and retractable. Thereby, the first shaft 532a and the second shaft 533a can be coaxially arranged and the press-fit portion 530a can be reduced in size. Furthermore, since the first press-fitting process and the second press-fitting process can be performed without exchanging the positions of the first shaft 532a and the second shaft 533a, it is possible to shorten the manufacturing time.

Second Modification

Figure 14:
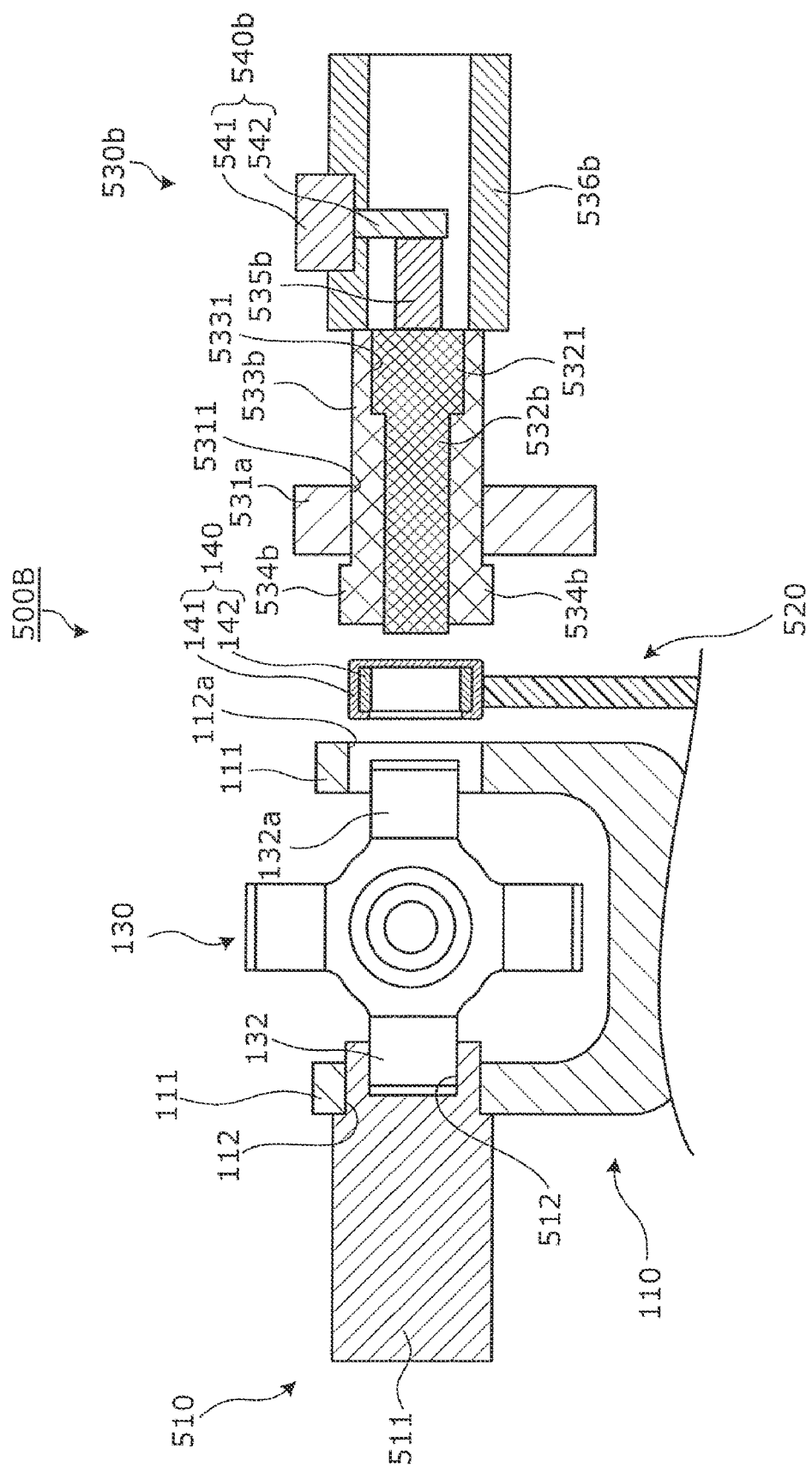
FIG. 14 is an explanatory view showing a main configuration of the manufacturing apparatus for the universal joint according to the first modification.

FIG. 14 is an explanatory view showing a main configuration of a manufacturing apparatus 500B for a universal joint according to a second modification. In FIG. 14, members other than the joint spider 130 are illustrated in a cross-sectional view. The same applies to FIGS. 15 and 16.

As shown in FIG. 14, in the manufacturing apparatus 500B according to the second modification, a press-fit portion 530b is different from the press-fit portion 530a of the manufacturing apparatus 500A according to the first modification. The following describes the press-fit portion 530b in detail.

The manufacturing apparatus 500B according to the second modification differs from the manufacturing apparatus 500A according to the first modification in that the press-fit portion 530b is provided with a switching mechanism 540b. The switching mechanism 540b connects a first shaft 532b and a second shaft 533b when the first shaft 532b press-fits the bearing 140 to the first position P1, and releases the connection when the bearing 140 is press-fitted to the second position P2.

Specifically, the press-fit portion 530b includes the support portion 531a, the first shaft 532b, the second shaft 533b, a first pressing portion 535b, a second pressing portion 536b, and the switching mechanism 540b.

The first shaft 532b is a portion for press-fitting the bearing 140 to the first position P1 (see FIG. 15) in the through-hole 112a of the first yoke 110 to temporarily assemble the bearing 140 with respect to the shaft portion 132a of the joint spider 130. Specifically, the first shaft 532b is a cylindrical shaft elongated in the axial direction, and a base end portion thereof serves as a large diameter portion 5321 having a diameter larger than that of other portions. The base end of the first shaft 532b is connected to the first pressing portion 535b. When the first shaft 532b moves closer to the joint spider 130 in the press-fitting direction by being pressed by the first pressing portion 535b, a distal end surface of the first shaft 532b abuts against the bearing 140, and the bearing 140 is press-fitted into the through-hole 112a to the first position P1.

Figure 16:
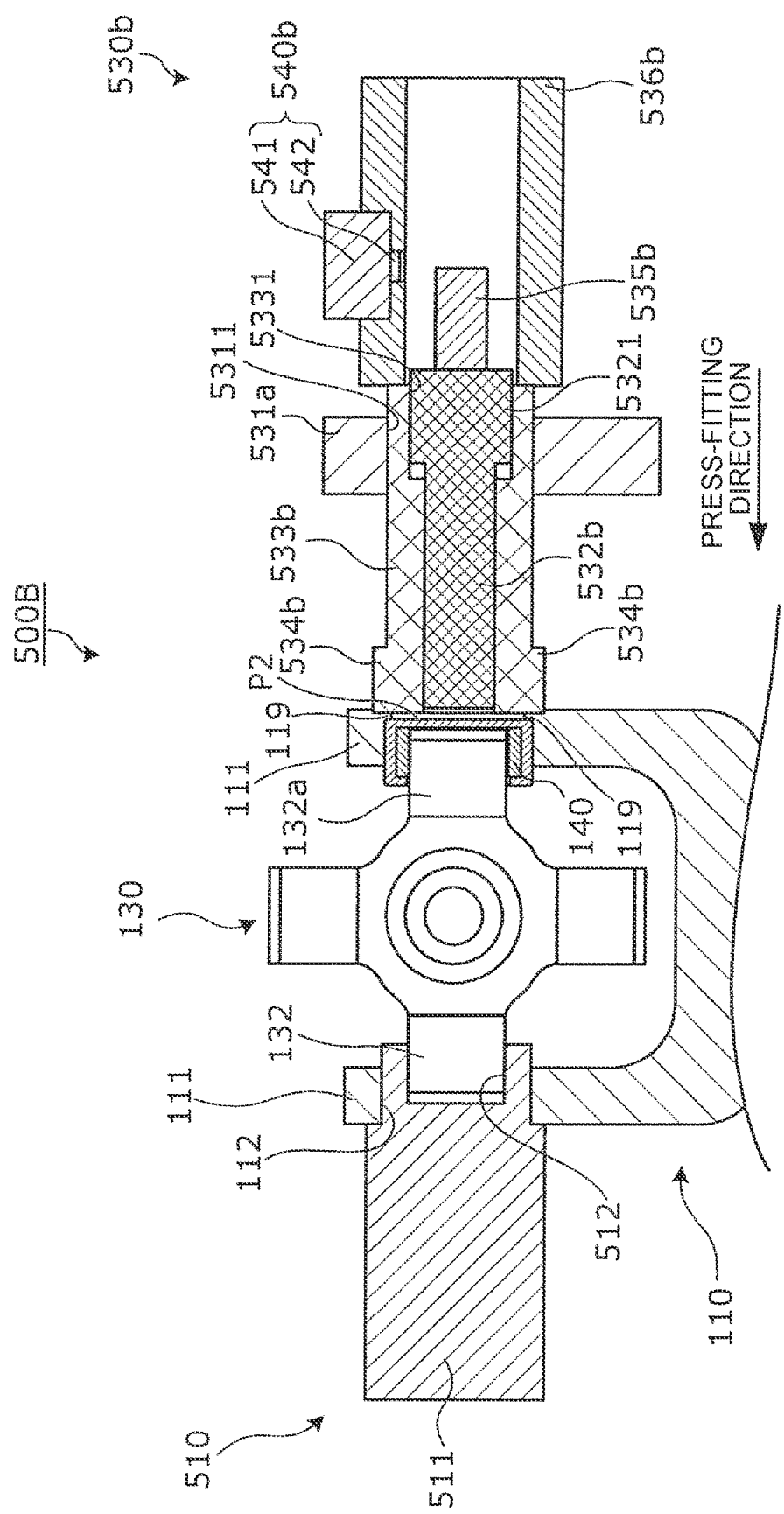
FIG. 16 is an explanatory view showing a second press-fitting process of the switching mechanism according to the second modification.

The second shaft 533b is a portion for press-fitting the bearing 140 at the first position P1 in the through-hole 112a to the second position P2 (see FIG. 16). Specifically, the second shaft 533b is a cylindrical shaft elongated in the axial direction. A base end of the second shaft 533b is connected to the second pressing portion 536b.

A hollow portion of the second shaft 533b has a shape corresponding to an outer shape of the first shaft 532b. Specifically, the hollow portion of the second shaft 533b has, on its base end side, an opening 5331 whose diameter is larger than that of the other portions. The large diameter portion 5321 of the first shaft 532b fits into the opening 5331 having a large diameter. Thus, the second shaft 533b advances in the press-fitting direction but does not retract in the retracting direction with respect to the first shaft 532b. In other words, the first shaft 532b can move with the second shaft 533b in the press-fitting direction, and can be separated from the second shaft 533b in the retracting direction.

In a state where the large diameter portion 5321 of the first shaft 532b is fitted in the opening 5331, the distal end of the first shaft 532b protrudes from the distal end of the second shaft 533b.

On the outer peripheral surface at the distal end of the second shaft 533b, a plurality of protrusions 534b protruding radially outward are provided. When the second shaft 533b moves closer to the joint spider 130 in the press-fitting direction by being pressed by the second pressing portion 536b, distal end surfaces of the protrusions 534b abut against a periphery of the through-hole 112a of the first yoke 110 to clinch the abutting portions. The second shaft 533b further presses the bearing 140 into the through-hole 112a with the clinched portions 119 (see FIG. 16) formed by the clinching, thereby press-fitting the bearing 140 to the second position P2.

The first pressing portion 535b is a cylindrical shaft elongated in the axial direction, and its distal end is connected to the first shaft 532b. The switching mechanism 540b is detachably connected to the base end of the first pressing portion 535b.

The second pressing portion 536b is a cylindrical shaft elongated in the axial direction, and its distal end is connected to the second shaft 533b. The switching mechanism 540b is attached to the second pressing portion 536b. The first pressing portion 535b is disposed in a hollow portion of the second pressing portion 536b. The second pressing portion 536b reciprocates in the axial direction by power from a drive source (not illustrated). Thereby, the second pressing portion 536b reciprocates the second shaft 533b in the axial direction.

The switching mechanism 540b is, for example, a solenoid, and includes a main body portion 541 and a movable shaft 542 that is advanceable and retractable with respect to the main body portion 541. The main body portion 541 is fixed to the second pressing portion 536b. The movable shaft 542 is normally disposed inside of the second pressing portion 536b so as to extend from the main body portion 541, and is retracted into the main body portion 541 in the second press-fitting process (see FIG. 16). The switching mechanism 540b may be an air cylinder.

Figure 15:
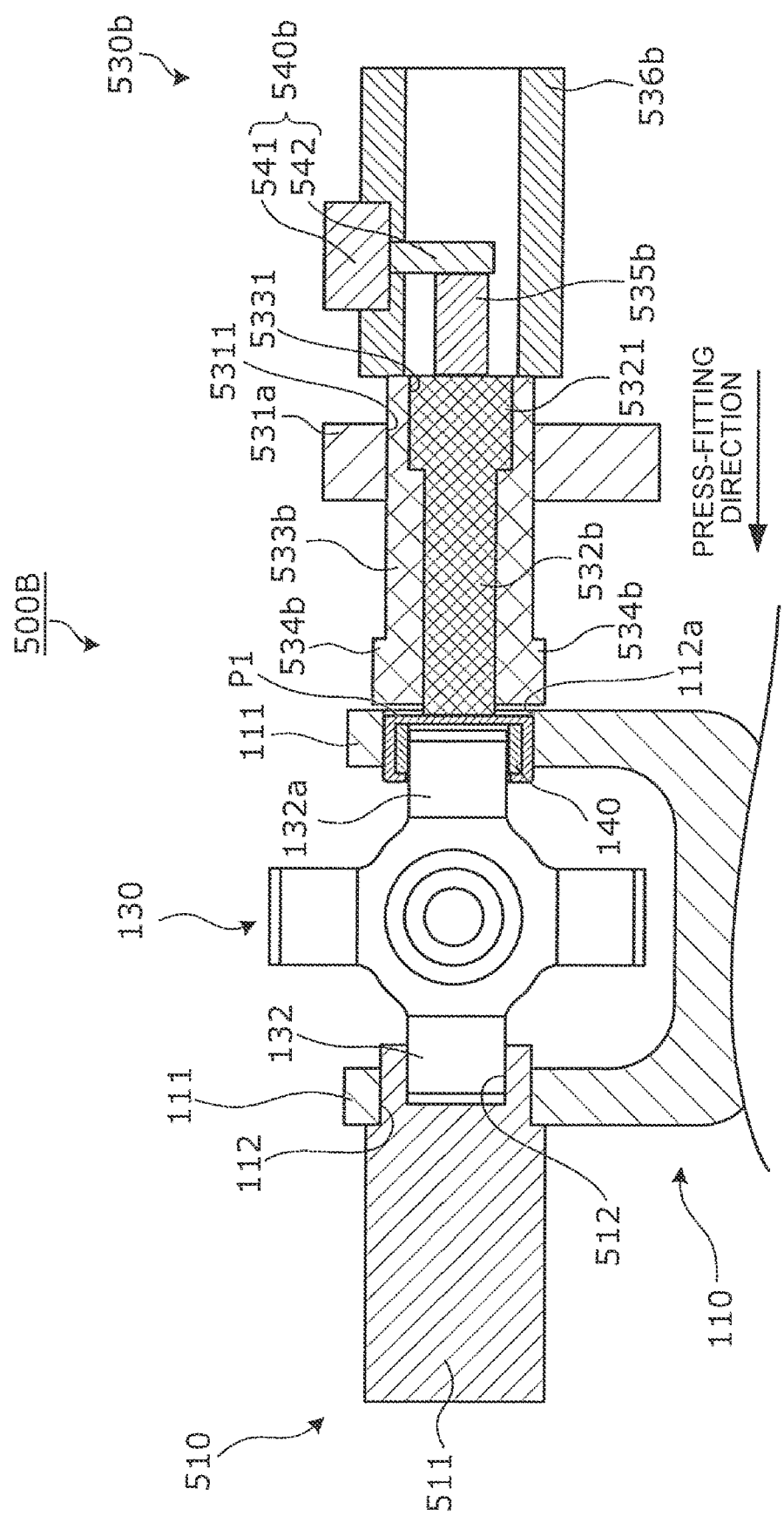
FIG. 15 is an explanatory view showing a normal state of a switching mechanism according to a second modification.

An operation of the switching mechanism 540b will be described based on FIGS. 15 and 16. FIG. 15 is an explanatory view showing the switching mechanism 540b according to the second modification in a normal state. FIG. 16 is an explanatory view showing a second press-fitting process of the switching mechanism 540b according to the second modification.

As shown in FIG. 15, in the normal state, the movable shaft 542 abuts against the base end of the first pressing portion 535b, and the first shaft 532b and the second shaft 533b are connected to each other via the first pressing portion 535b, the second pressing portion 536b, and the switching mechanism 540b. In this state, when the second pressing portion 536b moves in the press-fitting direction, the second shaft 533b is pressed by the second pressing portion 536b and moves in the press-fitting direction. At the same time, since the switching mechanism 540b is also moved in the press-fitting direction, the movable shaft 542 moves the first pressing portion 535b in the press-fitting direction, and the first shaft 532b is also moved in the press-fitting direction.

Meanwhile, as shown in FIG. 16, in the second press-fitting process, the movable shaft 542 is separated from the base end of the first pressing portion 535b, and the connection between the first shaft 532b and the second shaft 533b is released. In this state, when the second pressing portion 536b moves in the press-fitting direction, the second shaft 533b is pressed by the second pressing portion 536b and moves in the press-fitting direction. At this time, since the connection between the first shaft 532b and the second shaft 533b is released, the first pressing portion 535b and the first shaft 532b do not move.

Next, a manufacturing method for a universal joint using the manufacturing apparatus 500B will be described based on FIGS. 14 to 16. FIGS. 14 to 16 show processes of a manufacturing method for a universal joint according to the second modification.

As shown in FIG. 14, first, the first yoke 110, the joint spider 130, and the bearing 140 are set in the manufacturing apparatus 500B. In this state, the bearing 140, the shaft portion 132a, the through-hole 112a, the first shaft 532b, and the second shaft 533b are arranged on the same axis.

FIG. 15 shows the state of each part in the first press-fitting process in the second modification. As shown in FIG. 15, in the first press-fitting process, the switching mechanism 540b connects the first shaft 532b and the second shaft 533b to each other. Therefore, when the second pressing portion 536b of the press-fit portion 530b advances in the press-fitting direction, the first shaft 532b and the second shaft 533b also advance in the press-fitting direction.

As described above, in a state where the large diameter portion 5321 of the first shaft 532b is fitted in the opening 5331 of the second shaft 533b, the distal end of the first shaft 532b protrudes from the distal end of the second shaft 533b. Therefore, in the first press-fitting process, only the distal end surface of the first shaft 532b abuts against the bearing 140, and the bearing 140 is press-fitted to the first position P1 in the through-hole 112a. While the press-fitting is performed, the bearing holding portion 520 is descended at an appropriate timing so that interference with the second shaft 533b is prevented. Through the press-fitting, the bearing 140 is assembled to the shaft portion 132a of the joint spider 130 while entering the through-hole 112a. With the bearing 140 press-fitted to the first position P1, the bearing 140 is in a temporarily assembled state.

FIG. 16 shows the state of each part in the second press-fitting process according to the second modification. As shown in FIG. 16, in the second press-fitting process, the switching mechanism 540b releases the connection between the first shaft 532b and the second shaft 533b. Therefore, when the second pressing portion 536b of the press-fit portion 530b advances in the press-fitting direction, only the second shaft 533b advances in the press-fitting direction. When the second shaft 533b advances in the press-fitting direction, the distal end surfaces of the protrusions 534b abut against the periphery of the through-hole 112a of the first yoke 110. Subsequently, the distal end surfaces of the protrusions 534b clinch the abutting portions to form the clinched portions 119. The second shaft 533b further presses the bearing 140 into the through-hole 112a with the clinched portions 119, thereby press-fitting the bearing 140 from the first position P1 to the second position P2. Consequently, the bearing 140 is disposed at the final assembly position (second position P2).

When the second pressing portion 536b moves in the retracting direction, the second shaft 533b also moves in the retracting direction. During this movement, since the large diameter portion 5321 of the first shaft 532b fits into the opening 5331 of the second shaft 533b, the first shaft 532b is also pushed by the second shaft 533b in the retracting direction.

As described above, the manufacturing apparatus 500B according to the second modification includes the switching mechanism 540b that connects the first shaft 532b and the second shaft 533b when the first shaft 532b press-fits the bearing 140 to the first position P1, and releases the connection when the bearing 140 is press-fitted to the second position P2.

According to the above, when the first shaft 532b press-fits the bearing 140 to the first position P1, the switching mechanism 540b connects the first shaft 532b and the second shaft 533b to each other, and when the second shaft 533b press-fits the bearing 140 to the second position P2, the connection is released. Thus, the first press-fitting process and the second press-fitting process can be performed with one drive source for press-fitting, and the manufacturing apparatus 500B itself can be reduced in size.

Others

The manufacturing method and the manufacturing apparatus for the universal joint according to the present disclosure have been described based on the embodiment. However, an applicable embodiment is not limited to the embodiment.

For example, the embodiment exemplifies a case where the shaft portion 132a of the joint spider 130 and the bearing 140 are assembled to one of the arms 111 of the first yoke 110. However, the shaft portion 132a of the joint spider 130 and the bearing 140 may be assembled simultaneously to both of the arms 111.

Further, in the embodiment, the first universal joint 100 provided in the steering system 10 of an automobile is exemplified as the universal joint according to the present disclosure. However, it is possible to apply the manufacturing method and manufacturing apparatus according to the present disclosure to universal joints provided in other devices.

Embodiments obtained by making various modifications that may occur to those skilled in the art, as well as embodiments implemented by combining components and functions described in the embodiments and the modifications as desired without departing from the scope of the disclosure are also encompassed in the applicable embodiment.

The present disclosure is applicable to a manufacturing method and a manufacturing apparatus for a universal joint having a joint spider and a bearing.

What is claimed is:

1. A method of manufacturing a universal joint, the method comprising:
    temporarily assembling a bearing with respect to a through-hole of a yoke and a shaft portion of a joint spider, for rotatably supporting the shaft portion, by press-fitting the bearing to a first position in the through-hole of the yoke; and
    clinching, after the bearing is temporarily assembled, a portion of the yoke around the through-hole, and pressing the bearing deeper into the through-hole with a clinched portion formed by the clinching to press-fit the bearing to a second position located deeper than the first position in the through-hole.

2. The method according to claim 1, wherein a distance between the first position and the second position is 0.05 mm or more.

3. The method according to claim 1, wherein the yoke and the bearing are made of different metals.

* * * * *